US012265697B2

(12) United States Patent
Lee

(10) Patent No.: US 12,265,697 B2
(45) Date of Patent: Apr. 1, 2025

(54) COMPUTING DEVICE FOR COMMUNICATING WITH NETWORK SYSTEM COMPRISING PLURALITY OF CAMERAS, AND OPERATING METHOD THEREFOR

(71) Applicant: HANWHA TECHWIN CO., LTD., Seongnam-si (KR)

(72) Inventor: Sangyun Lee, Seongnam-si (KR)

(73) Assignee: Hanwha Vision Co., Ltd., Seongnam-si (KR)

(*) Notice: Subject to any disclaimer, the term of this patent is extended or adjusted under 35 U.S.C. 154(b) by 275 days.

(21) Appl. No.: 17/628,910

(22) PCT Filed: Sep. 26, 2019

(86) PCT No.: PCT/KR2019/012514
§ 371 (c)(1),
(2) Date: Jan. 21, 2022

(87) PCT Pub. No.: WO2021/020645
PCT Pub. Date: Feb. 4, 2021

(65) Prior Publication Data
US 2022/0261143 A1      Aug. 18, 2022

(30) Foreign Application Priority Data
Jul. 26, 2019    (KR) .................. 10 2019-0090704

(51) Int. Cl.
*G06F 3/04847*    (2022.01)
*G06F 3/0482*     (2013.01)
(Continued)

(52) U.S. Cl.
CPC ........ *G06F 3/04847* (2013.01); *G06F 3/0482* (2013.01); *G06F 3/0486* (2013.01); *H04N 7/181* (2013.01); *G08B 13/00* (2013.01)

(58) Field of Classification Search
CPC .. G06F 3/04847; G06F 3/0482; G06F 3/0486; H04N 7/181; H04N 21/431; G08B 13/00; G08B 13/19682; G08B 13/19669
See application file for complete search history.

(56) References Cited

U.S. PATENT DOCUMENTS 10,600,296 B2 * 3/2020 Hurley ................. G06F 16/434
10,805,449 B1 * 10/2020 Gordon ............... G06F 3/04817
(Continued)

FOREIGN PATENT DOCUMENTS

KR  10-2004-0079164    9/2004
KR  10-2011-0023633    3/2011
(Continued)

OTHER PUBLICATIONS

Georgakopoulos, D., Baker, D., Nodine, M. et al. Event-driven Video Awareness Providing Physical Security. World Wide Web 10, 85-109 (2007). https://doi.org/10.1007/s11280-006-0015-4 (Year: 2007).*

(Continued)

*Primary Examiner* — Andrew L Tank
(74) *Attorney, Agent, or Firm* — McLean IP Global; Jason Y. Pahng

(57) ABSTRACT

An method for a computing device comprises: listing, in a first region, candidate items indicating events that are detectable through selected cameras; displaying, in a first sub-region of a second region, a first selected item indicating an event of a first candidate item from among the candidate items in response to a second user input for dragging the first candidate item and dropping same into the second region; and displaying, in a second sub-region, a second selected item indicating an event of a second candidate item from among the candidate items in response to a third user input for dragging the second candidate item and dropping same into the second-sub region. The displaying the second (Continued)

selected item in the second sub-region comprises a step of providing a graphic interface for grouping the first and second selected items in the second region.

17 Claims, 16 Drawing Sheets

(51) Int. Cl.
 *G06F 3/0486* (2013.01)
 *G08B 13/00* (2006.01)
 *H04N 7/18* (2006.01)

(56) References Cited

U.S. PATENT DOCUMENTS

| | | | | |
|---|---|---|---|---|
| 2006/0179463 | A1* | 8/2006 | Chisholm | G08B 13/19656 |
| | | | | 348/E7.086 |
| 2006/0227997 | A1* | 10/2006 | Au | G08B 25/14 |
| | | | | 382/103 |
| 2007/0240190 | A1* | 10/2007 | Arseneau | H04N 7/181 |
| | | | | 348/E7.071 |
| 2011/0010624 | A1* | 1/2011 | Vanslette | G06Q 10/06 |
| | | | | 715/764 |
| 2011/0113382 | A1* | 5/2011 | Cannon | G06N 3/006 |
| | | | | 715/848 |
| 2014/0223301 | A1* | 8/2014 | Frenette | H04L 63/08 |
| | | | | 715/743 |
| 2014/0351800 | A1* | 11/2014 | Jao | G06F 8/41 |
| | | | | 717/140 |
| 2018/0160024 | A1 | 6/2018 | Kim | |
| 2019/0104020 | A1* | 4/2019 | Tero | G06Q 30/0635 |

FOREIGN PATENT DOCUMENTS

| | | | |
|---|---|---|---|
| KR | 10-2014-0036576 | | 3/2014 |
| KR | 10-2016-0084239 A | | 7/2016 |
| KR | 20160116842 A | * | 10/2016 |
| KR | 10-2017-0014133 A | | 2/2017 |
| KR | 10-2017-0019108 A | | 2/2017 |
| KR | 10-1855356 B1 | | 5/2018 |
| KR | 102018-0064713 | | 6/2018 |

OTHER PUBLICATIONS

Girgensohn et al. 2007. DOTS: support for effective video surveillance. In Proceedings of the 15th ACM international conference on Multimedia (MM '07). Association for Computing Machinery, New York, NY, USA, 423-432. https://doi.org/10.1145/1291233.1291332 (Year: 2007).*

Written Opinion of the ISA dated Apr. 22, 2020 for international application No. PCT/KR2019/012514.

International Search Report dated Apr. 22, 2020 for international application No. PCT/KR2019/012514.

* cited by examiner

COMPUTING DEVICE FOR COMMUNICATING WITH NETWORK SYSTEM COMPRISING PLURALITY OF CAMERAS, AND OPERATING METHOD THEREFOR

This application is a national stage application, filed under 35 U.S.C § 371, of international patent application number PCT/KR2019/012514, filed on Sep. 26, 2019, which is hereby incorporated by reference in its entirety. In addition, this application claims priority from Korean application number 10-2019-0090704, filed on Jul. 26, 2019, which is hereby incorporated by reference in its entirety.

BACKGROUND OF THE DISCLOSURE

Field of the Disclosure

The present disclosure relates to a network system and, more particularly, to a computing device for communicating with a network system comprising a plurality of cameras and an operating method therefor.

Related Art

User demands for digital cameras such as digital camcorders and camera phones are increasing. In line with this, digital cameras become more exquisite and have more diverse features. A plurality of digital cameras installed in a particular area may constitute a surveillance system and provide a higher level of security. These digital cameras may include not only features for capturing images and/or audio and but also features for analyzing the captured images and/or audio and generating events according to various conditions.

With the diversification of user demands, the surveillance system is capable of detecting an event occurrence according to a combination of one or more events such as motion detection and sound detection. The user may expect an event occurrence in a more desirable situation by properly selecting such a combination of events. Also, the surveillance system may include other types of sensors as well as digital cameras, and event generation using such sensors may be considered.

As these various types of events are supported, event settings may become more complicated. A setting screen for event settings may include complicated buttons for displaying various types of events and combining such events, and the user may find it difficult to set events under such an environment.

The above description is only for easily understanding the background art of the present disclosure, and shall not be understood as corresponding to the prior art known to those skilled in the art.

SUMMARY

Embodiments of the present disclosure relate to a computing device that offers greater convenience when configuring settings related to events that can be detected in a network system comprising a plurality of cameras, and an operating method therefor.

An embodiment of the present disclosure provides an operating method for a computing device that communicates with a network system comprising a plurality of cameras, the operating method comprising the steps of: receiving a first user input for selecting at least some of the plurality of cameras; displaying a first region and a second region separated from the first region, and listing, in the first region, candidate items indicating events that are detectable through the selected cameras; displaying, in a first sub-region of the second region, a first selected item indicating an event of a first candidate item from among the candidate items in response to a second user input for dragging the first candidate item and dropping same into the second region; displaying, in a second sub-region, a second selected item indicating an event of a second candidate item from among the candidate items in response to a third user input for dragging the second candidate item and dropping same into the second-sub region, which is adjacent to the first sub-region of the second region; and performing a set action according to all of the events of the first and second selected items, wherein the step of displaying the second selected item in the second sub-region comprises a step of providing a graphic interface for grouping the first and second selected items in the second region.

The first region and the second region may be arranged in a first direction, and the first and second selected items may be arranged in a second direction intersecting the first direction.

The providing of a graphic interface may comprise displaying the second selected item in such a way as to have a narrower width in the first direction than the first selected item.

The providing of a graphic interface may comprise displaying the second selected item in such a way as to have a smaller area than the first selected item.

The providing of a graphic interface may comprise displaying the first and second selected items in such a way as to adjoint each other.

The operating method may further comprise, when the first selected item is displayed in the first sub-region, displaying the second sub-region and the third sub-region spaced further apart from the first selected item than the second sub-region.

The operating method may further comprise: displaying, in the third sub-region, a third selected item indicating an event of the third candidate item from among the candidate items, in response to a fourth user input for dragging the third candidate item and dropping the same into the third-sub region; and performing a second action set for the event of the third selected item, regardless of the events of the first and second selected items.

The event of the second selected item may be different from the event of the first selected item, and the event of the third selected item may be the same as or different from the events of the first and second selected items.

The operating method may further comprise: displaying a third region separated from the first and second regions; listing, in the first region, action items indicating a plurality of actions supported by the computing device in response to a fourth user input for selecting the first and second selected items of the graphic interface; receiving a fifth user input for dragging at least one of the action items and dropping same into the third region; and determining that an action indicating the at least one of the action items is the set action.

The candidate items may further indicate detectable events through at least one device included in the network system along with the plurality of cameras.

Another aspect of the present disclosure provides a computing device for communicating with a network system comprising a plurality of cameras, the computing device comprising: a communicator; a display device; a user interface; and at least one processor configured to communicate with the network system through the communicator and receive user inputs via the user interface, wherein the at least one processor: displays a first region and a second region separated from the first region on the display device upon receiving a first user input for selecting at least some of the plurality of cameras, and lists, in the first region, candidate items indicating events that are detectable through the selected cameras; displays, in a first sub-region of the second region, a first selected item indicating an event of a first candidate item from among the candidate items in response to a second user input for dragging the first candidate item and dropping same into the second region; displays, in a second sub-region, a second selected item indicating an event of a second candidate item from among the candidate items in response to a third user input for dragging the second candidate item and dropping same into the second-sub region, which is adjacent to the first sub-region of the second region; and performs a set action according to all of the events of the first and second selected items, wherein the at least one processor provides a graphic interface for grouping the first and second selected items in the second region when displaying the second selected item in the second sub-region.

The first region and the second region may be arranged in a first direction, and the first and second selected items may be arranged in a second direction intersecting the first direction.

The graphic interface may comprise a graphic interface for displaying the second selected item in such a way as to have a narrower width in the first direction than the first selected item.

The graphic interface may comprise a graphic interface for displaying the second selected item in such a way as to have a smaller area than the first selected item.

The graphic interface may comprise a graphic interface for displaying the first and second selected items in such a way as to adjoint each other.

When the first selected item is displayed in the first sub-region, the at least one processor may further display the second sub-region and the third sub-region spaced further apart from the first selected item than the second sub-region.

The at least one processor may: display, in the third sub-region, a third selected item indicating an event of the third candidate item from among the candidate items, in response to a fourth user input for dragging the third candidate item and dropping the same into the third-sub region; and perform a second action set for the event of the third selected item, regardless of the events of the first and second selected items.

The candidate items may further indicate detectable events through at least one device included in the network system along with the plurality of cameras.

According to embodiments of the present disclosure, there is provided a computing device that offers greater convenience when configuring settings related to events that can be detected in a network system comprising a plurality of cameras, and an operating method therefor.

DESCRIPTION OF EXEMPLARY EMBODIMENTS

Hereinafter, exemplary embodiments of the present disclosure will now be described in detail with reference to the accompanying drawings. It should be noted that, in the following description, only parts necessary to understand operations according to the present disclosure will be described, and descriptions of other parts will be omitted so as not to obscure the subject matter of the present disclosure. Also, the present disclosure is not limited to the embodiments described herein but may be embodied in other forms. However, the exemplary embodiments described herein are provided so as to describe the present disclosure in detail so that those skilled in the art may easily carry out the technical spirit of the disclosure.

Throughout the specification, when a part is described as being "connected" to another part, this includes not only a case where they are "directly connected" to each other but also a case where they are "indirectly connected" to each other with another element interposed therebetween. The terminology used herein is for the purpose of describing particular embodiments only and is not intended to limit the present disclosure. Throughout the specification, when a part is described as "including" or "comprising" a component, this means that another component is not be excluded from the part but may be included in the part, unless particularly described to the contrary. "At least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Figure 1:
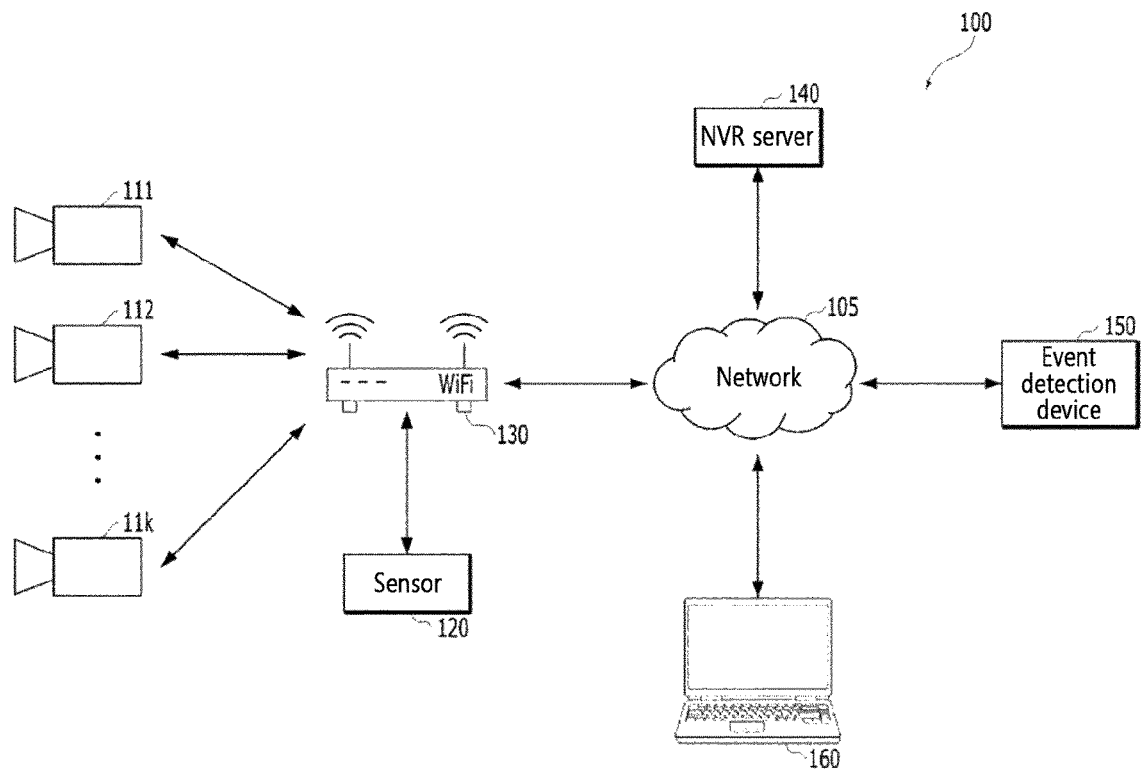
FIG. 1 is a block diagram showing a network system comprising a plurality of cameras according to an embodiment of the present disclosure.

FIG. 1 is a block diagram showing a network system comprising a plurality of cameras according to an embodiment of the present disclosure.

Referring to FIG. 1, the network system 100 may include a network 105, first to k-th cameras 111 to 11$k$, at least one sensor 120, a router 130, a network video recorder (NVR) server 140, an event detection device 150, and a client terminal 160.

The network system 100 may include a plurality of devices, servers, and/or software components that operate to perform various methodologies in accordance with the embodiments of the present disclosure described herein. The devices and/or servers illustrated in FIG. 1 may be deployed in other ways and that the operations performed and/or the services provided by such devices and/or servers may be combined or separated for the embodiments described herein and may be performed by a greater number or fewer number of devices and/or servers. One or more devices and/or servers may be operated and/or maintained by the same or different entities.

The network 105 connects the router 130, the NVR server 140, the event detection device 150, and the client terminal 160. The network 105 may include at least one of a public network, at least one private network, a wired network, a wireless network, other types of proper network, and a combination of them. The router 130, the NVR server 140, the event detection device 150, and the client terminal 160 each may include at least one of a wired communication function and a wireless communication function, and therefore may communicate with one another via the network 105.

The first to k-th cameras 111 to 11$k$ may include an image capturing module and a microphone to capture images and audio. The first to k-th cameras 111 to 11$k$ may communicate with the router 130 via wires and/or wirelessly. The first to k-th cameras 111 to 11$k$ may be connected to the network 105 via the router 130 and transmit the captured images and audio to the NVR server 140, the event detection device 150, and/or the client terminal 160 which are connected to the network 105.

The first to k-th cameras 111 to 11$k$ each may detect various types of events from the captured images and audio, and may transmit, as an event detection signal, data from a detection result to the event detection device 150 via the router 130. For example, at least some of the first to k-th cameras 111 to 11$k$ may detect an object from a captured image, and may detect a motion of the detected object and generate an event detection signal. For example, part of the first to k-th cameras 111 to 11$k$ may detect noise such as a fog from the captured image, and when the image contains relatively much noise, an event detection signal may be generated. For example, part of the first to k-th cameras 111 to 11$k$ may analyze captured audio, and may generate an event detection signal when a target sound such as a baby crying or a gunshot is detected from the captured audio.

Moreover, a sensor 120 for detecting other types of events may be provided. The sensor 120 may be connected to the network 105 via the router 130, and may transmit, as an event detection signal, data from a detection result, to the event detection device 150 via the router 130. For example, the sensor 120 may detect an event in which power supplied to the first to k-th cameras 111 to 11$k$ is shut off. For example, the sensor 120 may include an infrared light source and an infrared sensor, and may detect a moving object or person using the infrared light source. Besides, sensors for detecting various types of events may be provided in accordance with the embodiments.

The router 130 is connected to the network 105. The router 130 may connect the first to k-th cameras 111 to 11$k$ and the sensor 120 to the network 105. The router 130 may load received data packets to its internal memory and at the same time transmit the loaded data. The router 130 may transmit data and/or signals received from the first to k-th cameras 111 to 11$k$ and the sensor 120 to components connected to the network 105. Also, the router 130 may transmit data and/or signals received from the components connected to the network 105 to any one of the first to k-th cameras 111 to 11$k$ and the sensor 120.

The first to k-th cameras 111 to 11$k$, the sensor 120, and the router 130 may be installed in spaces relatively adjacent to one another, and may be connected with wires or wirelessly via the router 130 and form one local network system.

The NVR server 140 which communicates with the local network system formed by the first to k-th cameras 111 to 11$k$, the sensor 120, and the router 130 may be provided. The NVR server 140 may provide the components on the network 105 with an interface with the first to k-th cameras 111 to 11$k$ and the sensor 120. In the embodiments, the NVR server 140 may store the images and audio captured by the first to k0th cameras 111 to 11$k$. Also, the NVR server 140 may store event detection signals from the first to k-th cameras 111 to 11$k$ and the sensor 120. The event detection device 150 may access the NVR server 140 and read image, audio, and event detection signals stored in the NVR server 140. As such, if the NVR server 140 is provided, the event detection device 150 may acquire data and/or signals associated with the first to k-th cameras 111 to 11$k$ and the sensor 120 through the NVR server 140.

The event detection device 150 is connected to the network 105. The event detection device 150 may acquire event detection signals from the first to k-th cameras 111 to 11$k$ and the sensor 120 through the NVR server 140, and may perform preset actions based on the acquired event detection signals. For example, the event detection device 150 may transmit an alarm signal to the client terminal 160 based on the acquired event detection signals. In other embodiments, the event detection device 150 may acquire event detection signals from the first to k-th cameras 111 to 11$k$ and the sensor 120 without the NVR server 140.

The event detection device 150 may be one of various types of computing devices capable of transmitting and receiving information in a wired and/or wireless environment, such as a computer, an ultra mobile PC (UMPC), a workstation, a net-book, a personal digital assistant (PDA), a portable computer, a web tablet, a wireless phone, a mobile phone, a smart phone, an e-book, and a portable multimedia player (PMP).

Figure 2:
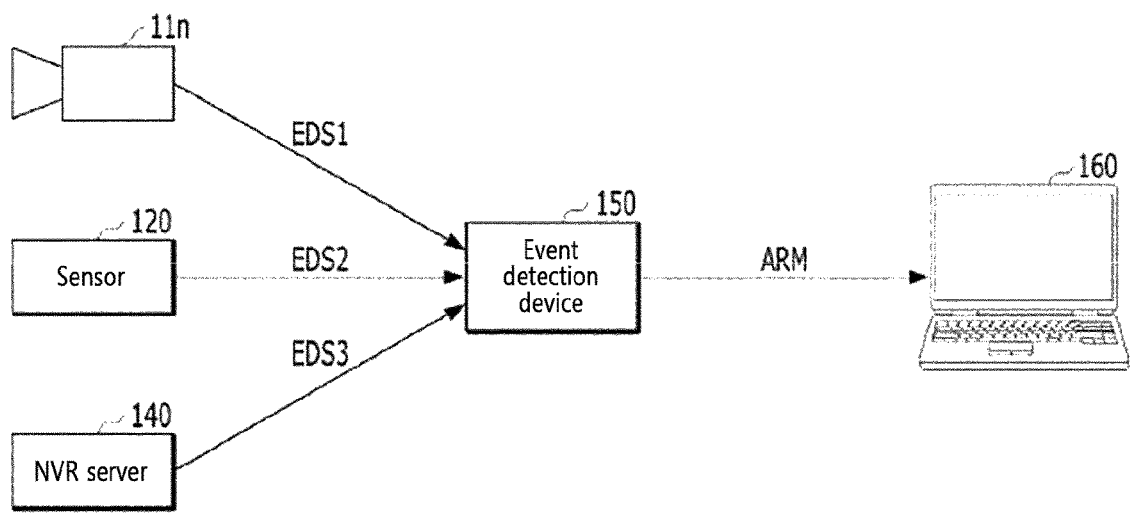
FIG. 2 is a view showing an embodiment of a process in which an event detection device performs a preset action based on event detection signals.

FIG. 2 is a view showing an embodiment of a process in which an event detection device performs a preset action based on event detection signals.

Referring to FIG. 2, the event detection device 150 may receive an event detection signal EDS1 from one (11$n$ where n is an integer greater than or equal to 1 and smaller than or equal to k) of the first to k-th cameras 111 to 11$k$ and receive an event detection signal EDS2 from the sensor 120. Moreover, the event detection device 150 may receive an event detection signal EDS3 from the NVR server 140 as well. For example, the NVR server 140 may include a function for detecting an event from images and/or audio captured by the first to k-th cameras 111 to 11$k$ or additional signals provided by them, and may generate the event detection signal EDS3 in accordance with this function.

As such, the event detection device 150 may receive event detection signals from the first to k-th cameras 111 to 11$k$ and the NVR server 140, and may perform a preset action based on received event detection signals. The event detection device 150 may perform a preset action when selected event detection signals are generated. For example, the event detection device 150 may perform a preset action, when the first and second event detection signals EDS1 and EDS2 are generated. In this instance, the selected event detection signals may be defined by the user. That is, the user may select and set events that trigger an action to be performed by the event detection device 150. The event detection device 150 according to embodiments of the present disclosure provide greater convenience when the user selects and sets events. In embodiments, the action to be performed may be defined by the user. For example, the action to be performed may include an operation of transmitting an alarm signal ARM to the client terminal 160, as illustrated in FIG. 2.

Figure 3:
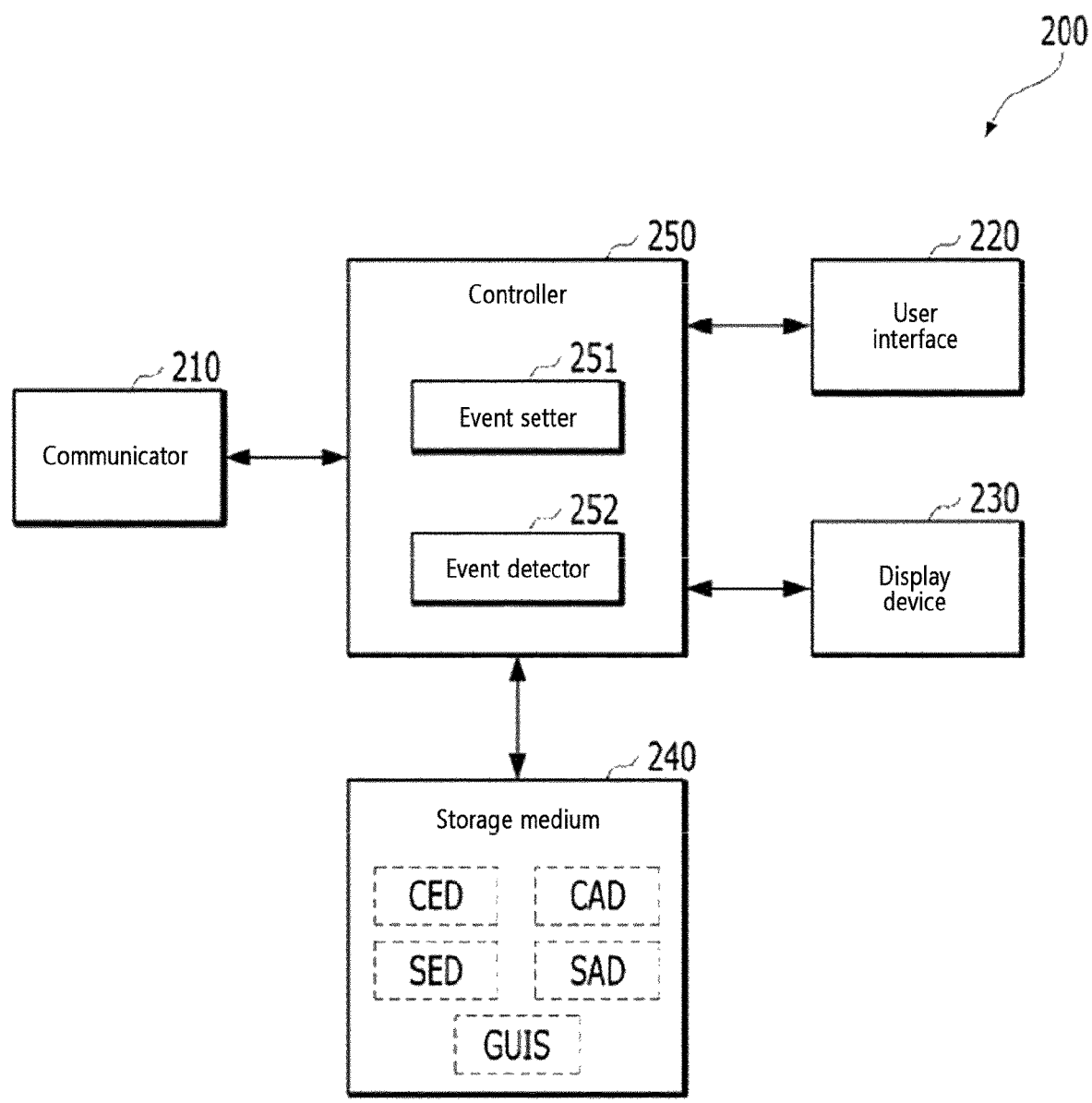
FIG. 3 is a block diagram showing an embodiment of the event detection device of FIG. 1.

FIG. 3 is a block diagram showing an embodiment of the event detection device of FIG. 1.

Referring to FIGS. 1 and 3, the event detection device 200 may include a communicator 210, a user interface 220, a display device 230, a storage medium 240, and a controller 250.

The communicator 210 is connected to the controller 250. The communicator 210 is configured to access the network 105 in response to a control of the controller 250. The communicator 210 may include at least one of a wired communication function and a wireless communication function.

The user interface 220 receives user input for controlling operations of the controller 250. The user interface 220 may include a mouse, a jog wheel, a jog switch, a keypad, a dome switch, a touch pad (static pressure/capacitive), and so forth.

The display device 230 operates in response to a control of the controller 250. The display device 230 displays information processed by the event detection device 200 or the controller 250. For example, the display device 230 may display various graphic interfaces according to a control of the controller 250. If the display device 230 is integrated with a touchpad to constitute a touchscreen, the display device 230 may visualize the user interface 220. Embodiments of screens displayed on the display device 230 are illustrated in FIGS. 6 to 13, FIG. 16, and FIG. 17.

The display device 230 may include at least one of various types of display devices such as a liquid crystal display, an organic light-emitting diode display, and a flexible display.

The storage medium 240 may include various types of non-volatile storage media that maintain stored data even if the power is shut off—for example, flash memory, a hard disk, etc. The storage medium 240 is configured to write and read data in response to a control of the controller 250.

The controller 250 is connected to the communicator 210, the user interface 220, the display device 230, and the storage medium 240. The communicator 250 may include an event setter 251 and an event detector 250.

The event setter 251 is configured to generate a group consisting of selected events among events that are detectable through the first to k-th cameras 111 to 11k and the sensor 120, according to user inputs described herein, and to set an action corresponding to the generated event group. The event setter 251 may receive, from the first to k-th cameras 111 to 11k and the sensor 120, information on events supported by them, and store the received information on events in the storage medium 240 as candidate event data CED. The event setter 251 may display screens on the display device 230 through a graphic interface source GUIS stored in the storage medium 240 by referring to the candidate event data CED. The graphic interface source GUIS may include various objects such as items, icons, images, and text and layouts. The event setter 251 may select part of events of candidate event data CED according to user inputs on the screen, and may generate information on the group of selected events as set event data SED. Also, the event setter 251 may select at least one of actions of stored candidate action data CAD according to user inputs on the screen, and generate information on the selected action as set action data SAD. Screens and user inputs associated with this will be described with reference to FIGS. 5 to 13 and FIGS. 15 to 17.

As explained with reference to FIG. 2, the event detector 252 may monitor event detection signals generated from the components of the network system 100, identify whether event detection signals corresponding to the set event data SED are generated, and perform an action corresponding to the set action data SAD according to an identification result.

In embodiments, the event setter 251 and the event detector 252 each may be implemented through at least one of software, hardware, firmware, and a combination thereof. The event setter 251 and the event detector 252 may be integrated or segmented into a larger number of components according to embodiments.

Figure 4:
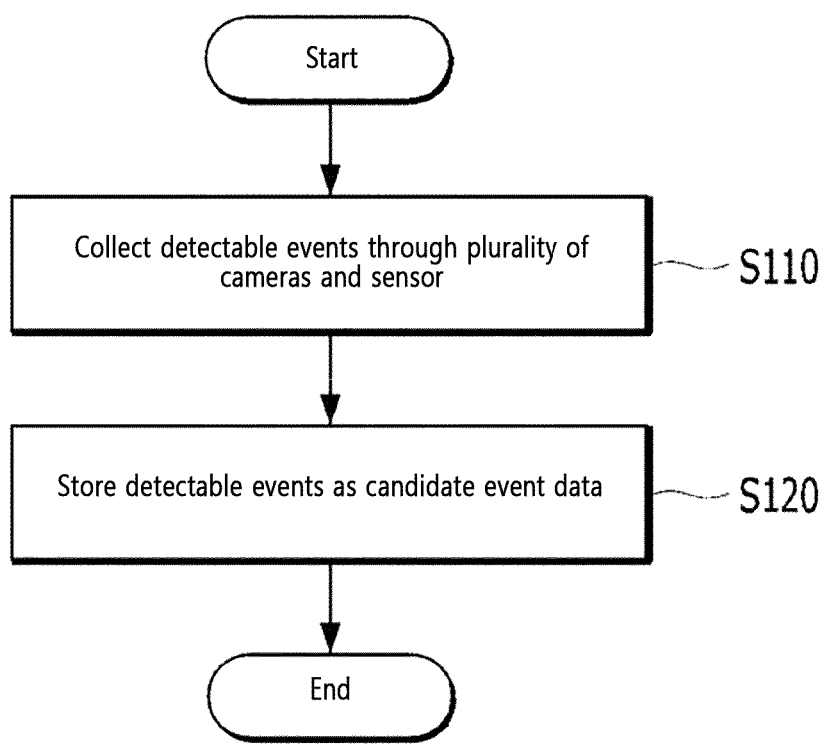
FIG. 4 is a sequential chart showing an embodiment of a method in which the event detection device collects detectable events.

FIG. 4 is a sequential chart showing an embodiment of a method in which the event detection device collects detectable events.

Referring to FIGS. 1 and 4, in step S110, the event detection device 150 may collect detectable events through the components of the network system.

The event detection device 150 may receive information on events supported (i.e., detectable) by the first to k-th cameras 111 to 11k and the sensor 120 when establishing communications with them. In embodiments, the information on events supported by the first to k-th cameras 111 to 11k and the sensor 120 and the names, IP addresses, and MAC addresses thereof may be acquired by the NVR server 140, and provided from the NVR server 140 to the event detection device 200. To this end, the NVR server 140 may communicate with the first to k-th cameras 111 to 11k and the sensor 120 based on an Open Network Video Interface Forum (ONVIF) standard.

In step S120, the event detection device 150 may store information on collected events as candidate event data CED (see FIG. 3).

Figure 5:
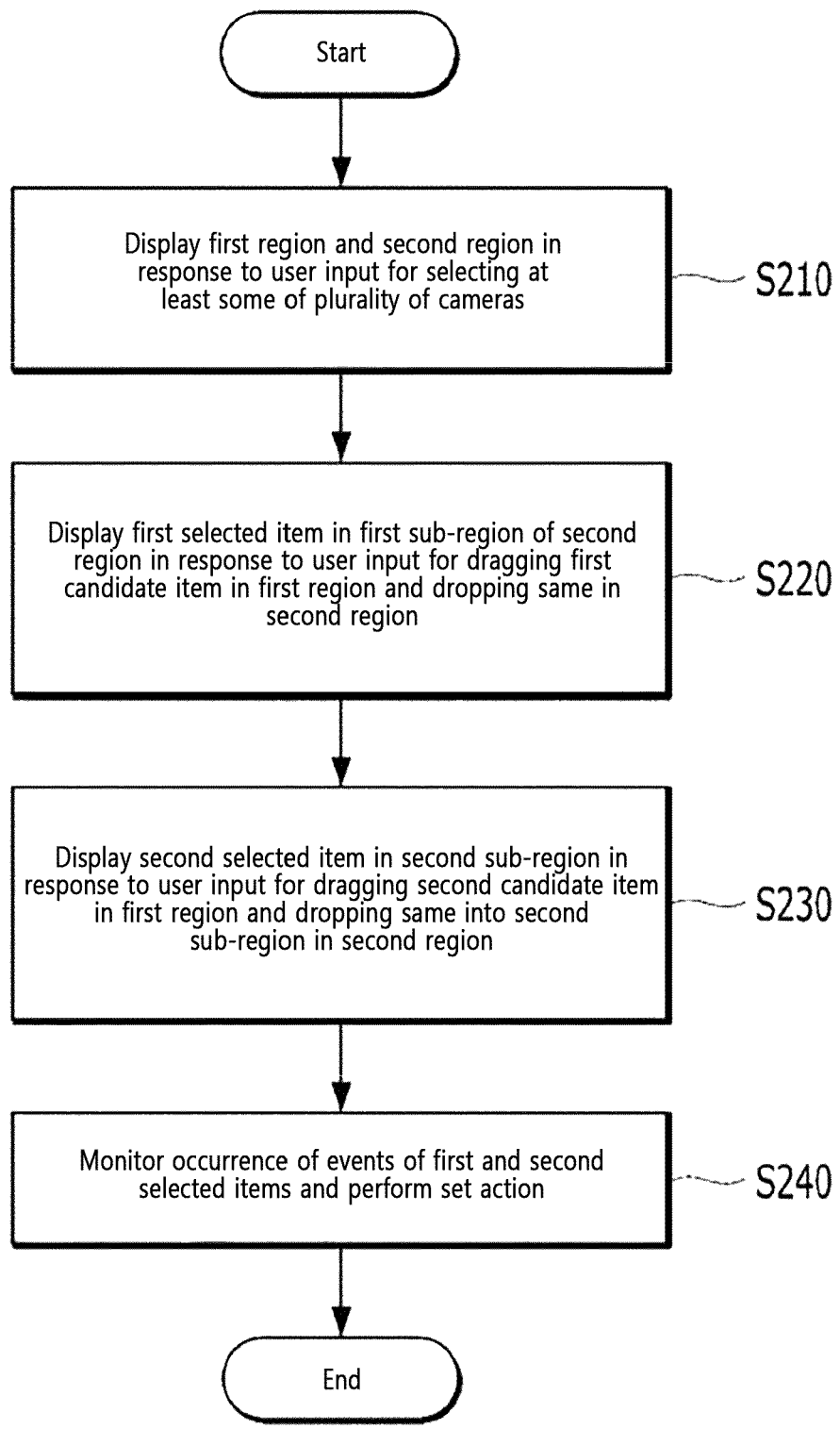
FIG. 5 is a sequential chart showing an embodiment of a method in which the event detection device generates a group of collected events.
Figure 6:
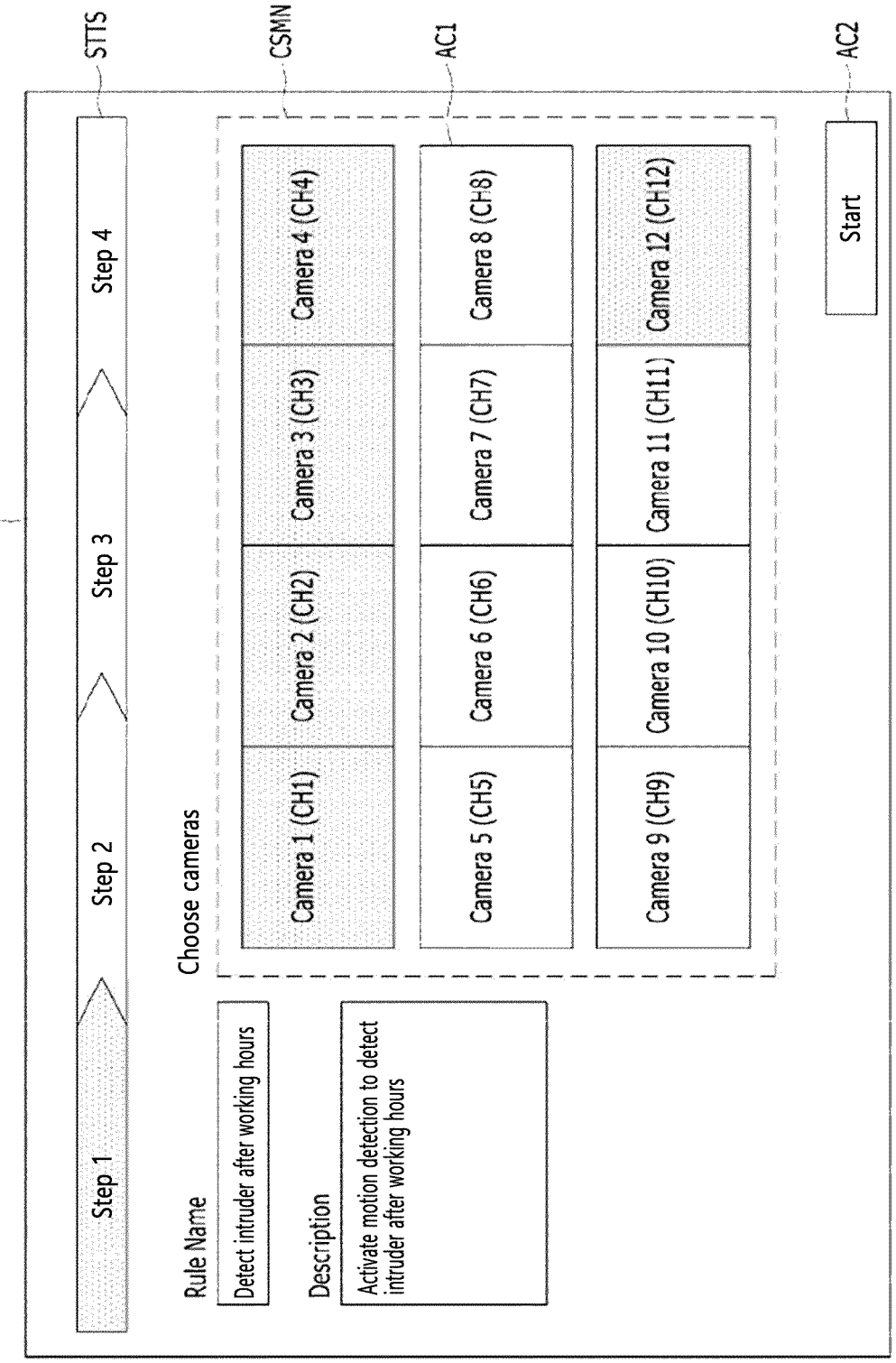
FIG. 6 is a view showing an example of a screen displayed to receive a user input for selecting part of a plurality of cameras.

FIG. 5 is a sequential chart showing an embodiment of a method in which the event detection device generates a group of collected events. FIG. 6 is a view showing an example of a screen displayed to receive a user input for selecting part of a plurality of cameras. FIGS. 7 to 10 are views showing examples of screens displayed in steps S210 to S230 of FIG. 5.

Referring to FIGS. 1 to 5, in step S210, the event detection device 150 displays a first region and a second region separated from the first region in response to a user input for selecting at least some of a plurality of cameras 111 to 11k. In this instance, candidate items indicating events that are detectable through the selected cameras are listed in the first region.

Referring to FIG. 6, a first setting window 301 displayed on the event detection device 150 is illustrated. The first setting window 301 may include a status display area STTS and a camera selection menu CSMN. As illustrated in FIG. 6, the first setting window 301 may further include areas displaying additional information such as the name, description, etc. of a set event.

The status display area STTS may represent a current step among a plurality of steps. The camera selection menu CSMN may include first icons AC1 respectively corresponding to the plurality of cameras 111 to 11k (see FIG. 1). In FIG. 6, the camera selection menu CSMN is exemplified as including 12 first icons AC1. Each of the first icons AC1 may include various information on a corresponding camera—for example, the name, IP address, MAC address, etc. of the corresponding camera. Part of the first icons AC1 may be selected in response to a user input for selecting at least some of the first icons AC1. FIG. 5 illustrates that the first icons AC1 corresponding to Cameras 1 to 4 and 12 are selected and shaded. Accordingly, the cameras corresponding to the selected first icons AC1 may be selected. The selection of cameras may be completed in response to a user input for selecting a second icon AC2 of the first setting window 301, thereby displaying a second setting window 302 of FIG. 7.

Figure 7:
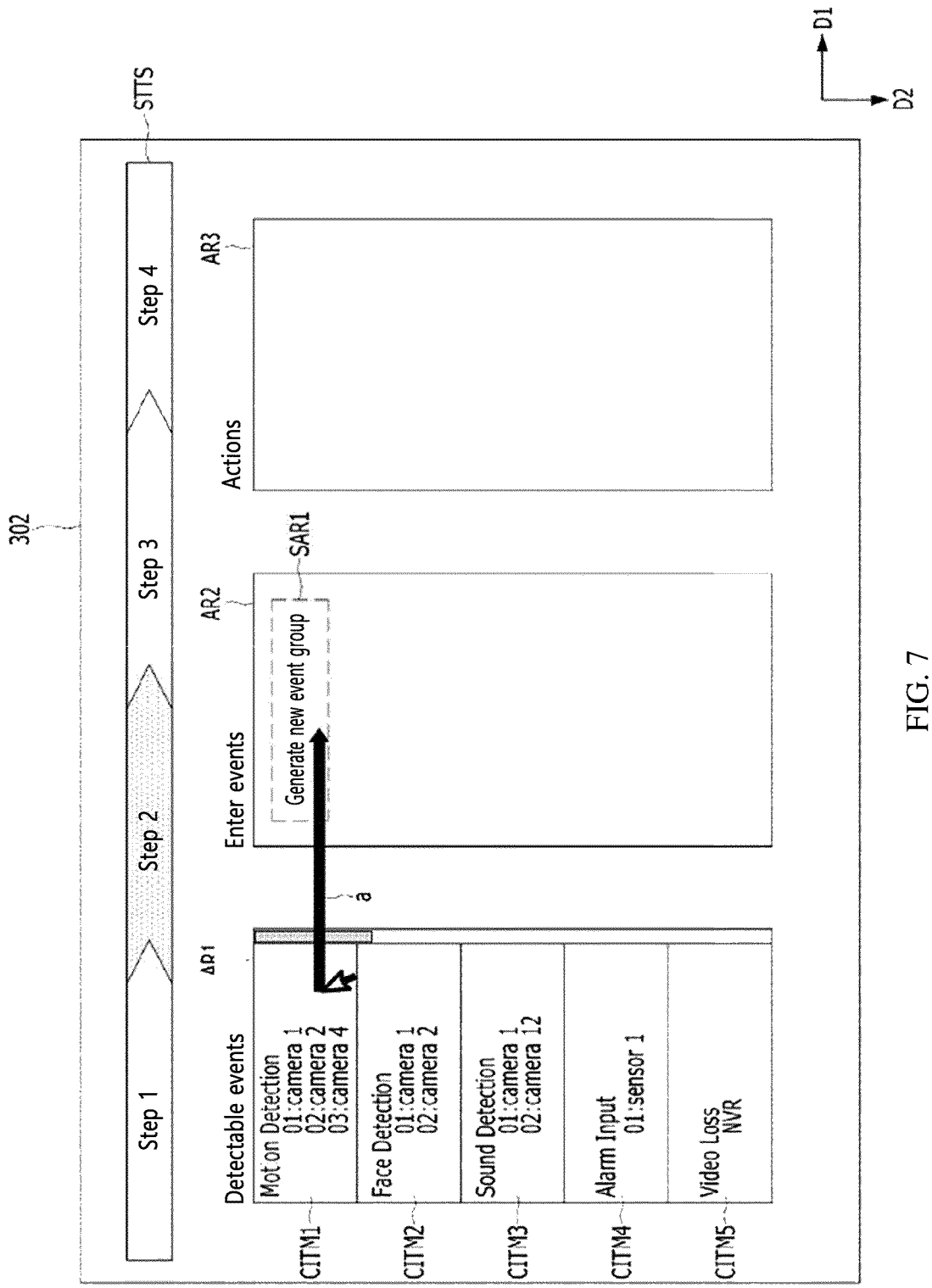
FIGS. 7 to 10 are views showing examples of screens displayed in steps S210 to S230 of FIG. 5.

Referring to FIG. 7, the second setting window 302 may include a status display area STTS and first to third regions AR1 to AR3. The first to third regions AR1 to AR3 are arranged in a first direction D1.

Events that are detectable through the selected cameras are listed in the first region AR1. Also, candidate items indicating events that are detectable through other components within the network system 100 other than the plurality of cameras 111 to 11k may be further listed. For example, candidate items indicating events that are detectable through the selected cameras, the sensor 120, and the NVR server 140 may be listed in the first region AR1. In FIG. 7, five candidate items CITM1 to CITM5 are listed. The first to fifth items CITM1 to CITM5 may be arranged in a second direction D2 intersecting the first direction D1. Each candidate item may indicate a corresponding event and a device supporting this event. In embodiments, each candidate item may represent a different event type. For example, the first candidate item CITM1 may represent a motion detection event, and may display the names of cameras supporting the motion detection event. The second candidate item CITM2 may represent a face detection event, and may display the names of cameras supporting the face detection event. The third candidate item CITM3 may represent a sound detection event, and may display the names of cameras supporting the sound detection event. The fourth candidate item CITM4 may represent an alarm input event, and may display the name of a device supporting the alarm input event, for example, the name of the sensor 120 (see FIG. 1). The fifth candidate item CITM5 may represent a video loss event, and may display the name of a device capable of detecting a video loss event from the first to k-th cameras 111 to 11k, for example, the name of the NVR device 140 (see FIG. 1). In embodiments, each candidate item may have a different color.

Referring again to FIGS. 1 and 5, in step S220, the event detection device 150 may display, in a first sub-region of the second region, a first selected item indicating an event of the first candidate item from among the candidate items listed in the first region in response to a user input for dragging the first candidate item and dropping the same into the second region.

Referring again to FIG. 7, a user input (a) for dragging one of the candidate items CITM1 to CITM5 in the first region AR1, for example, the first candidate item CITM1, and dropping the same into the second region AR2 is received. In embodiments, the first sub-region SAR1 may be displayed in the second region AR2, and the user input (a) for dragging the first candidate item CITM1 and dropping the same into the first sub-region SAR1 may be received.

Figure 8:
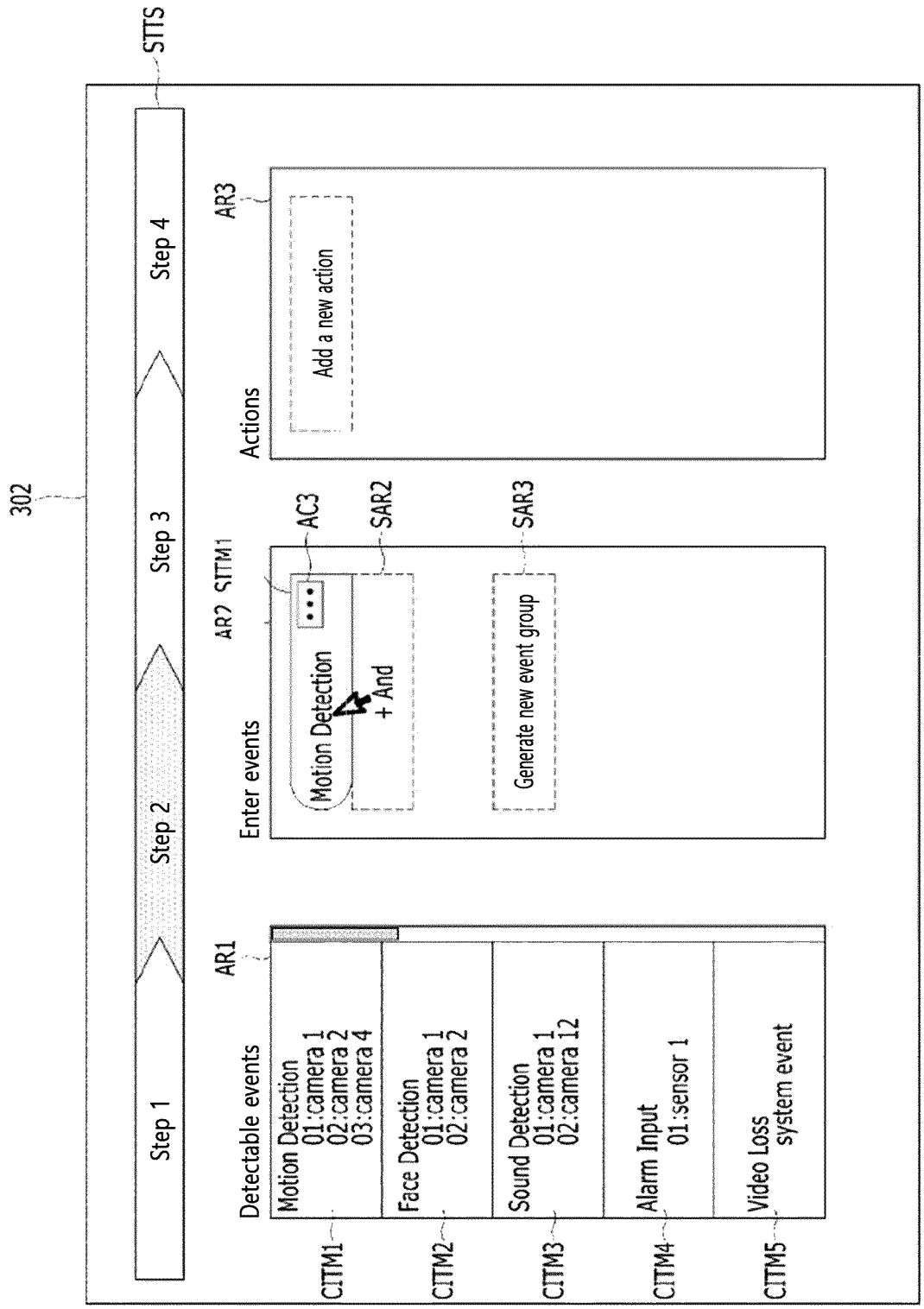

Next, referring to FIG. 8 together with FIG. 7, the first selected item SITM1 indicating an event (e.g., motion detection event) of the first candidate item CITM1 is displayed in the first sub-region SAR1 in response to the user input (a). In embodiments, a selected item may have the same color as a corresponding candidate item, which helps indicate an association between the candidate item and the selected item. In embodiments, a selected item may further include a third icon AC3. An additional setting window for setting details of a corresponding event in response to a selection of the third icon AC3 may be provided. For example, the user may set a degree of sensitivity to motion for each of cameras supporting a motion detection event through the additional setting window. For example, the user may view an image of each of the cameras supporting a motion detection event through the additional setting window.

When the first selected item SITM1 is displayed in the first sub-region SAR1, an additional sub-region SAR2 adjacent to the first selected item SITM1 may be further displayed. The second sub-region SAR2 may adjoin the first selected item SITM1. In other embodiments, the second sub-region SAR2 may have a wider area including the first selected item SITM1.

Moreover, when the first selected item SITM1 is displayed in the first sub-region SAR1, a third sub-region SAR3 spaced further apart from the first selected item SITM1 than the second sub-region SAR2 may be further displayed. The third sub-region SAR3 corresponds to an additional event group that may be generated. This will be described in further details with reference to FIGS. 16 and 17.

Referring again to FIGS. 1 and 5, in step S230, the event detection device 150 displays, in the second sub-region, the second selected item indicating an event of the second candidate item from among the candidate items, in response to a user input for dragging the second candidate item and dropping the same into the second-sub region of the second region. In this instance, the event detection device 150 provides a graphic interface for grouping the first selected item and the second selected item.

Figure 9:
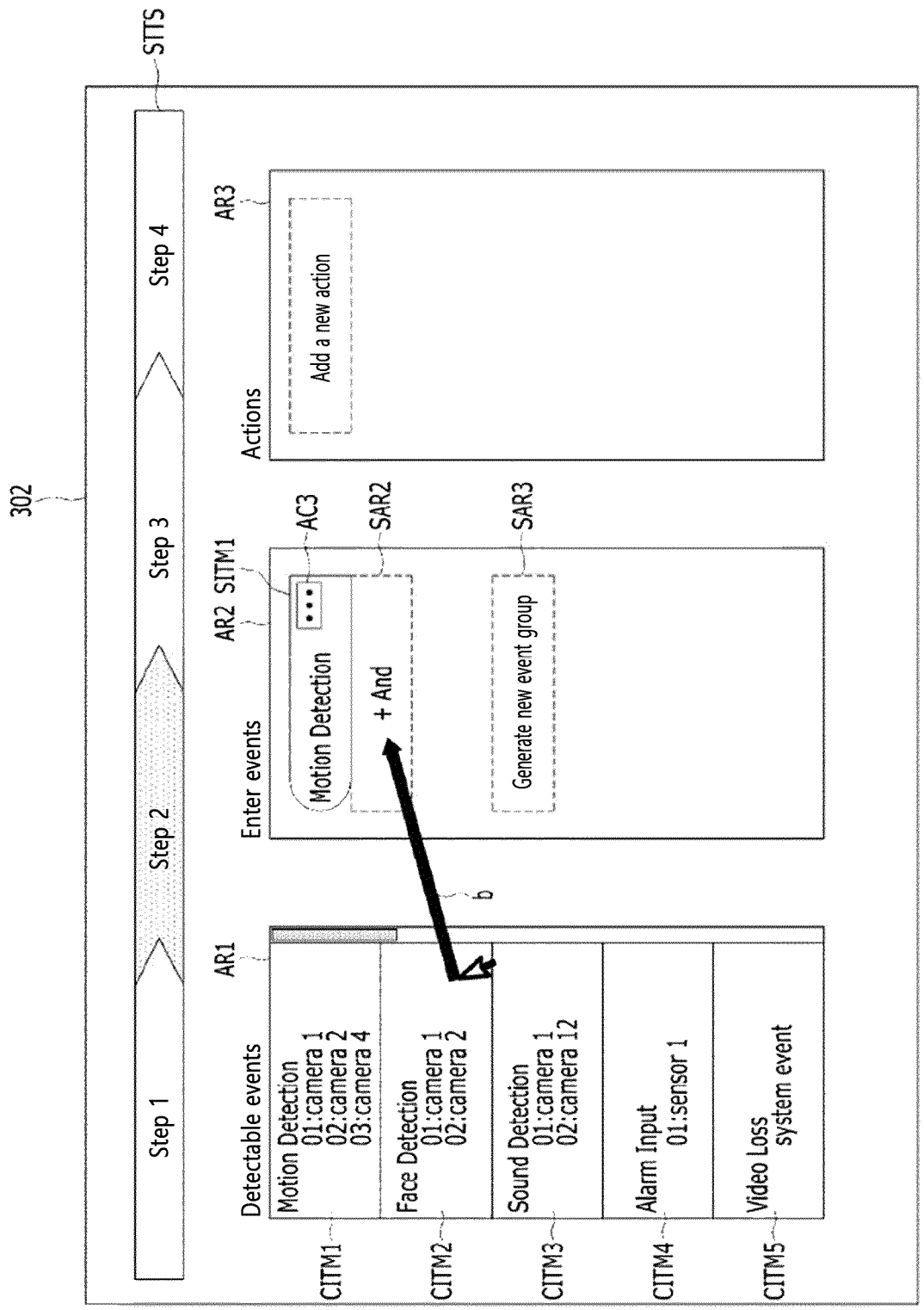

Referring to FIG. 9, a user input (b) for dragging the second candidate item CITM2 from among the candidate items CITM1 to CITM5 in the first region AR1 and dropping the same into the second sub-region SAR2 is received. For example, the user input (b) may include a drag and drop input for overlapping the second candidate item CITM2 at least partially with the second sub-region SAR2.

Figure 10:
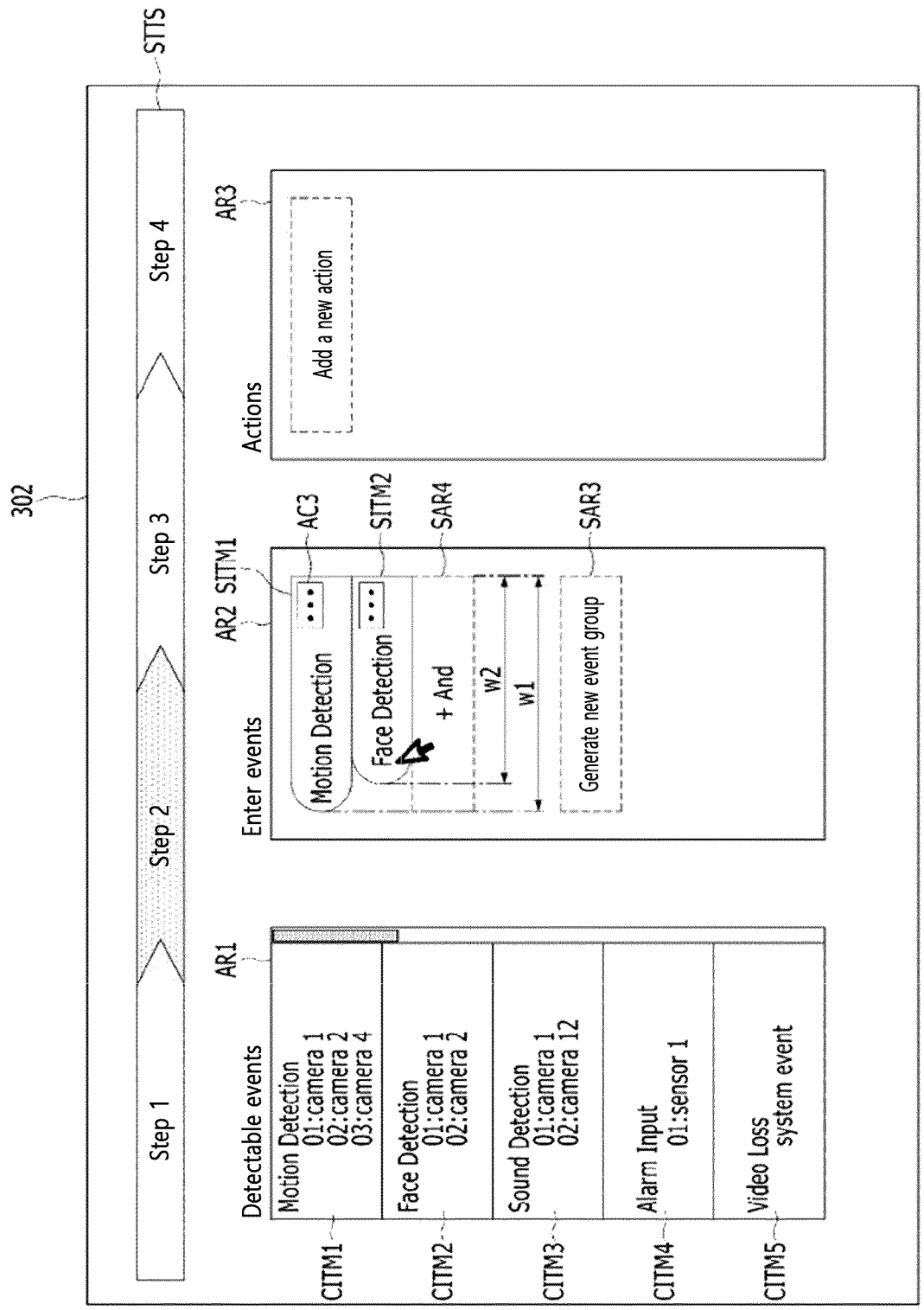

Subsequently, referring to FIG. 10 along with FIG. 9, the second selected item SITM2 indicating an event (e.g., face detection event) of the second candidate item CITM2 is displayed in the second sub-region SAR2 in response to the user input (b). The event of the second selected item SITM2 may be different from the first selected item CITM1. In embodiments, if a user input for dragging the first candidate item CITM1 of the first region AR1 and dragging the same into the second sub-region SAR2 is received, the corresponding first selected item SITM1 may not be displayed in the second sub-region sAR2.

The first and second selected items SITM1 and SITM2 are arranged in the second direction D2 (see FIG. 7). When the second selected item SITM2 is displayed, a graphic interface showing grouping of the first and second items SITM1 and SITM2 is provided. In embodiments, the first and second selected items SITM1 and SITM2 are arranged in the second direction D2 (see FIG. 7), and the first and second selected items SITM1 and SITM2 may be displayed in such a way as to adjoin each other. In embodiments, the second selected item SITM2 may be displayed in such a was as to have a narrower width in the first direction D1 (see FIG. 7) than the first selected item SITM1. In FIG. 10, the first selected item SITM1 has a first width w1, and the second selected item SITM2 has a second width w2 which is smaller than the first width w1. In embodiments, the second selected item SITM2 may be displayed in such a way as to have a smaller area than the first selected item SITM1.

When the second selected item SITM2 is displayed in the second sub-region SAR2, an additional sub-region SAR4 adjacent to the second selected item SITM2 may be further displayed. Accordingly, the position of the third sub-region SAR3 may be changed. The fourth sub-region SAR4 may adjoin the second selected item SITM2. In other embodiments, the fourth sub-region SAR4 may have a wide area including the first and second selected items SITM1 and SITM2.

Referring again to FIGS. 1 and 5, in step S240, the event detection device 150 monitors the occurrence of events of the first and second selected items and performs a set action.

The event detection device 150 may monitor event detection signals (see EDS1 to EDS3 of FIG. 2) of the components within the network system 100, such as the first to k-th cameras 111 to 11k, the sensor 120, and the NVR server 140, and perform a set action when event detection signals corresponding to events of the first and second selected items are generated. For example, the event detection device 150 may generate an alarm signal (see ARM of FIG. 2) indicating the occurrence of an event. In another embodiment, if a pan-tilt-zoom (PTZ) camera exists among the first to k-th cameras 111 to 11k, the event detection device 150 may change a capturing area of the PTA camera. Besides, the event detection device 150 may perform various actions.

According to an embodiment of the present disclosure, the event detection device 150 provides a setting window including the first and second regions, and provides a graphic interface for displaying items grouped in the second region in response to user inputs for dragging items indicating detectable events and dropping them into the second region from the first region. Afterwards, the event detection device 150 may perform a set action when all of the events corresponding to the grouped items are detected. Since the items grouped according to the user inputs for dragging and dropping are shown, the user may easily identify the grouped items, and therefore greater user convenience may be offered to generate and/or define a group of corresponding events. Accordingly, the event detection device 150 may be provided to offer greater convenience.

Furthermore, the above action to be performed may be set by the user.

Figure 11:
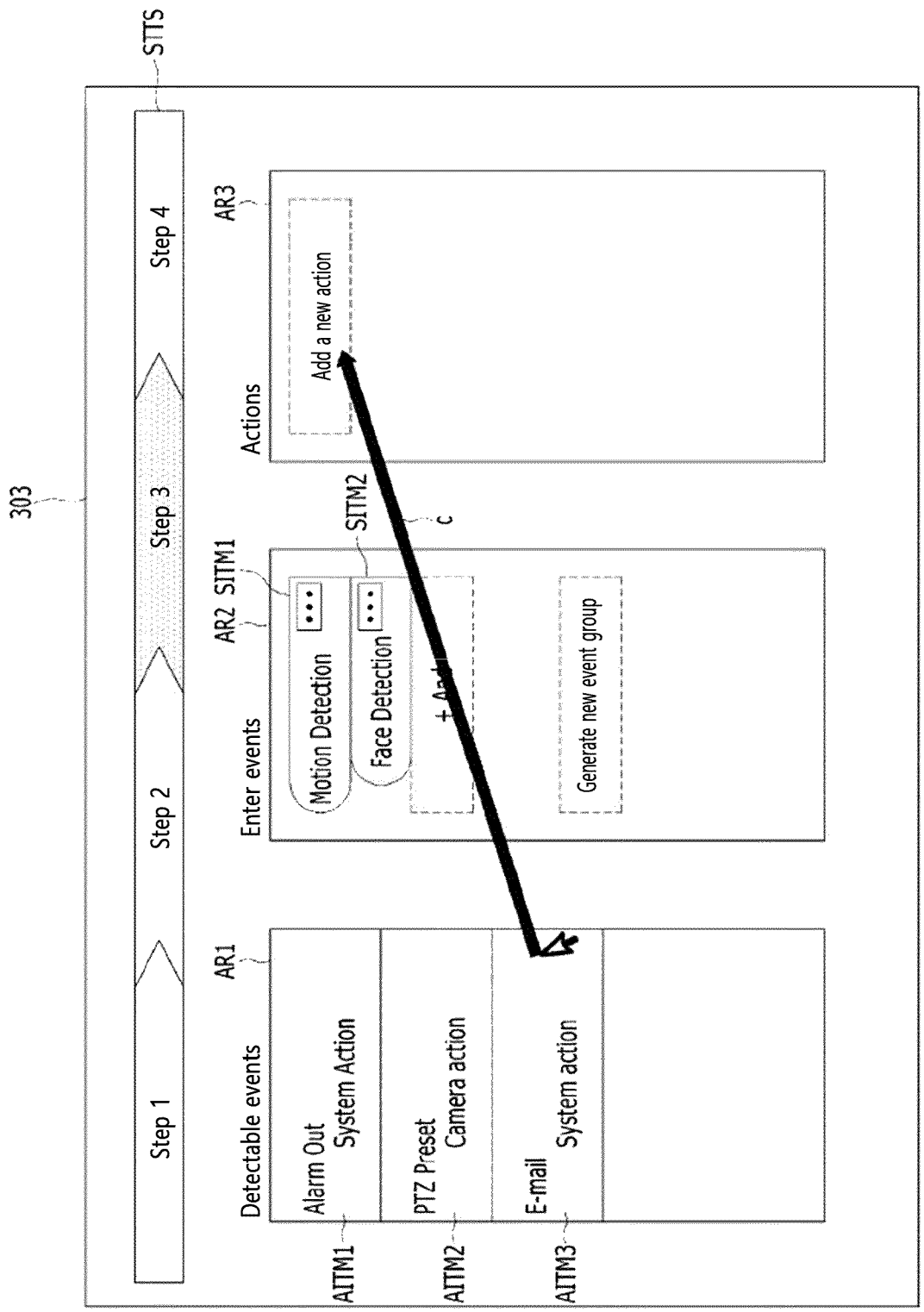
FIGS. 11 to 13 are views showing examples of screens displayed to set an action corresponding to a set group of selected items.
Figure 12:
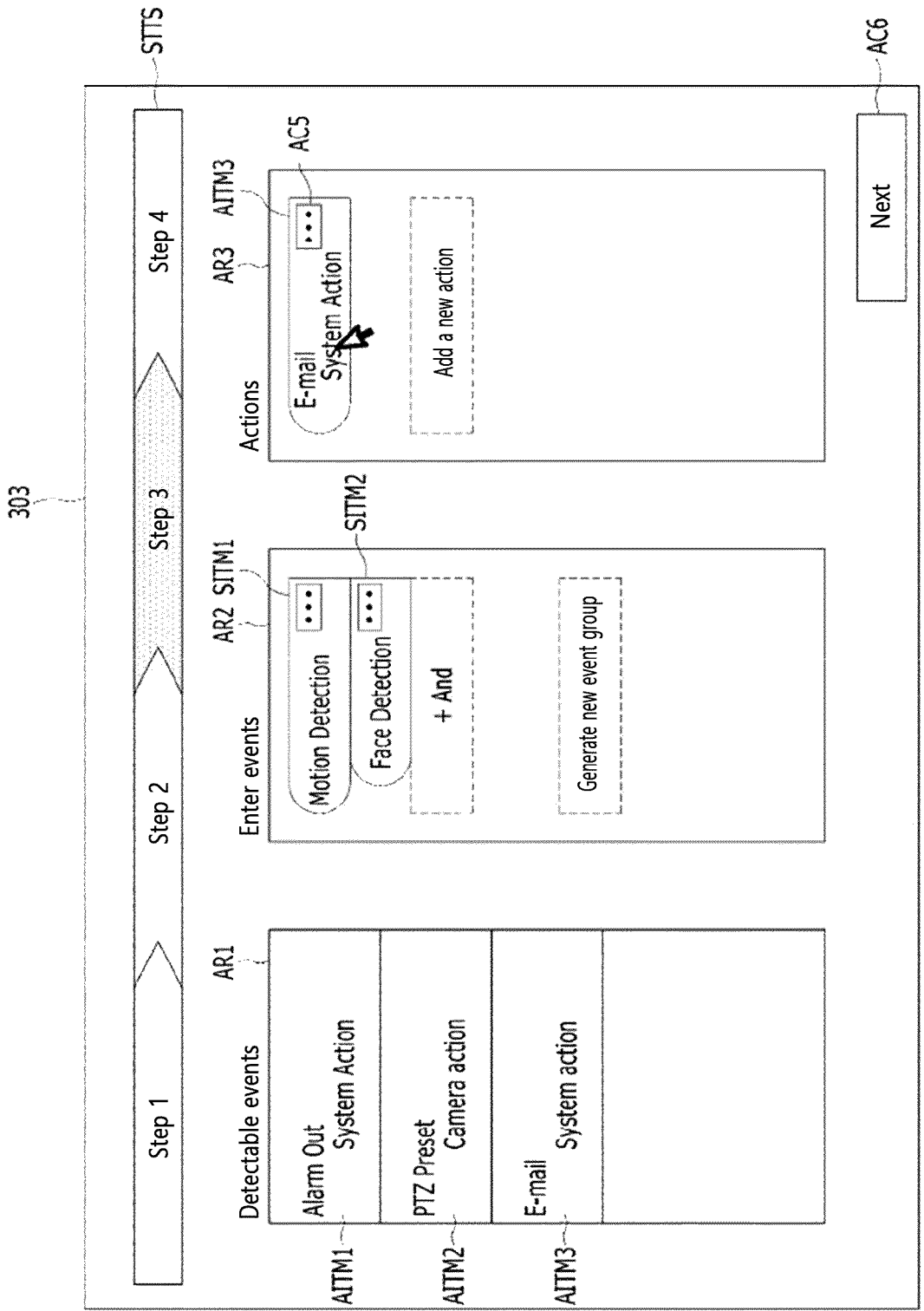
Figure 13:
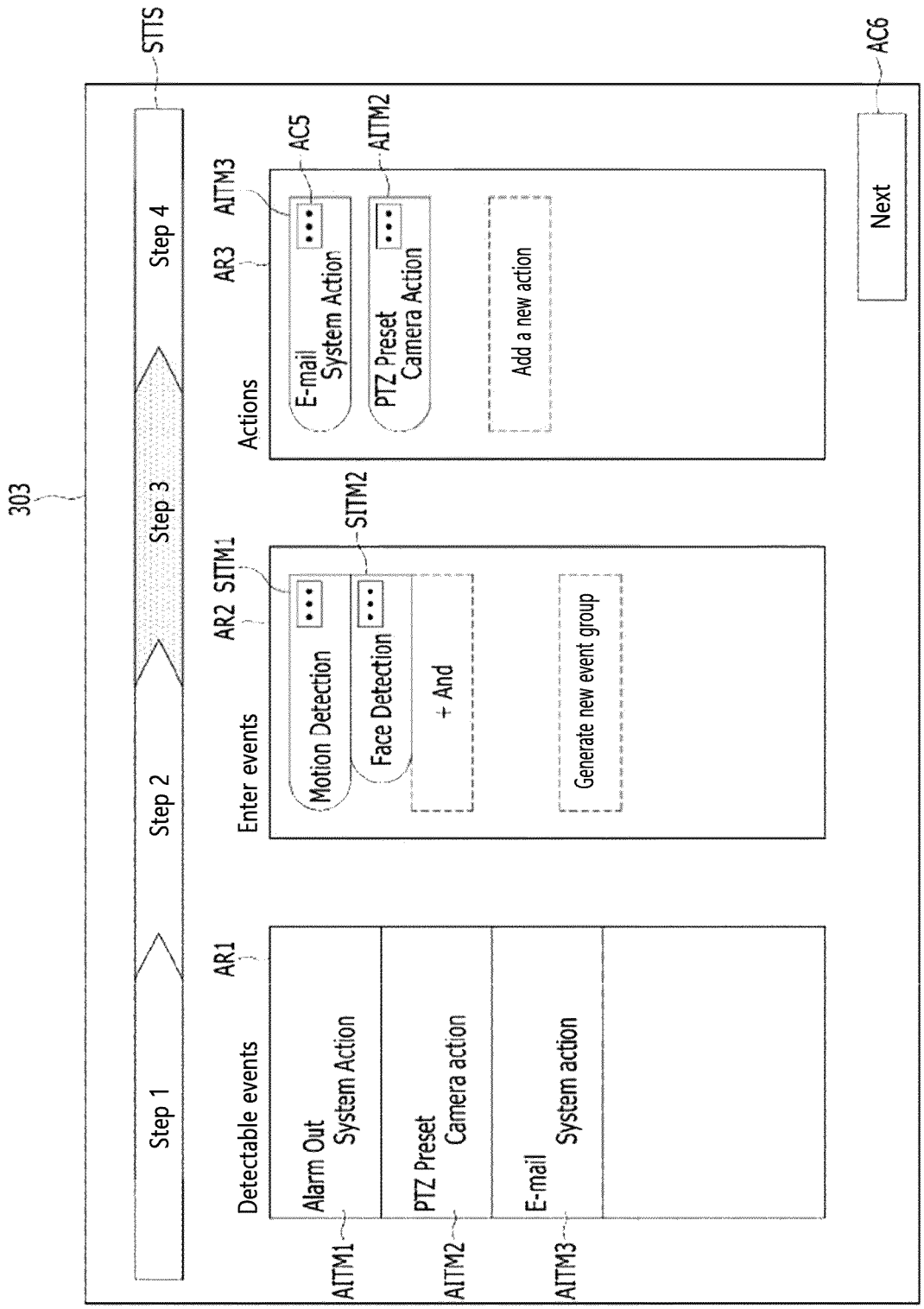

FIGS. 11 to 13 are views showing examples of screens displayed to set an action corresponding to a set group of selected items.

Referring to FIG. 11, a third setting window 303 including first to third regions AR1 to AR3 is displayed. Action items AITM1 to AITM3 indicating a plurality of actions supported by the event detection device 150 are listed in the first region AR1. The candidate items CITM1 to CITM4 of FIG. 10 displayed in the first region AR1 in response to a user input may be changed into the action items AITM1 to AITM3 of FIG. 11. For example, the event detection device 150 may display the action items AITM1 to AITM3 in the first region AR1, in response to a user input for selecting part of the first and second selected items SITM1 and SITM2 or an icon associated with the first and second selected items SITM1 and SITM2. Each action item may display information on the action to be performed. For example, the first action item AITM1 may indicate an operation of outputting an alarm by the event detection device 150, the second action item AITM2 may indicate a specific operation performed by the PTZ camera, and the third action item AITM3 may indicate an operation of transmitting an email to a designated address by the event detection device 150. Each action item may include an area indicating which device the corresponding operation is performed by.

A user input (c) for dragging any one of the first to third action items CAITM1 to CAITM3, for example, the third action item AITM3, and dropping the same into the third region AR3 may be received. Referring to FIG. 12, the third action item AITM3 is displayed in the third region AR3 in response to the user input (c). In embodiments, the third action item AITM3 included in the third region AR3 may have the same color compared to the first region AR1, which helps indicate an association between the third action items AITM3 of the first and third regions AR1 and AR3. The third action item AITM3 included in the third region AR3 may have a different shape compared to the first region AR1. In embodiments, the third action item AITM3 included in the third region AR3 may further include a fifth icon AC5 that triggers provision of an additional setting window for setting details of a corresponding action when the third action item AITM3 included in the third region AR3 is selected.

In this manner, action items for the first and second selected items SITM1 and SITM2 may be added in the third region AR3. Referring to FIG. 13, an additional action item AITM2 may be further included in the third region AR3.

Selection of the action items for the first and second selected items SITm1 and SITm2 may be completed in response to a user input for selecting a sixth icon AC6 of the second setting window 302. FIG. 13 illustrates that the second and third action items AITM2 and AITM3 are selected. In embodiments, a setting window for other additional settings may be further provided in response to a user input for selecting the sixth icon AC6. When all of the first and second selection items SITM1 and SITM2 occur, the event detection device 150 may perform actions corresponding to the second and third action items AITM2 and AITM3.

Figure 14:
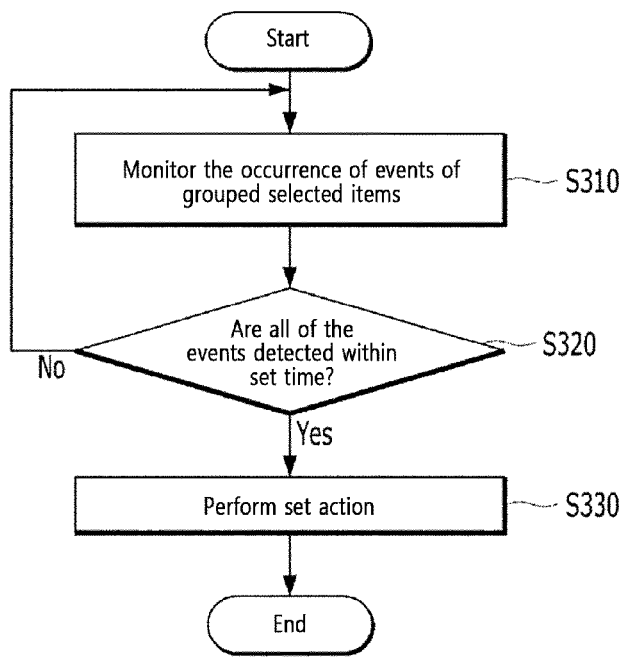
FIG. 14 is a sequential chart showing an embodiment of step S240 of FIG. 5.

FIG. 14 is a sequential chart showing an embodiment of step S240 of FIG. 5.

Referring to FIGS. 1 and 14, in step S310, the event detection device 150 monitors the occurrence of events of grouped selected items.

In S320, the event detection device 150 performs the step S330 depending on whether all of the corresponding events are detected within a set time. The event detection device 150 identifies whether the event detection signals (see EDS1 to EDS3 of FIG. 2) corresponding to the events of the selected items within a set time.

In step S330, the event detection device 140 performs a set action. In embodiments, the action to be performed may be set by the user. An action may be set in accordance with a user input explained with reference to FIGS. 11 to 13.

Figure 15:
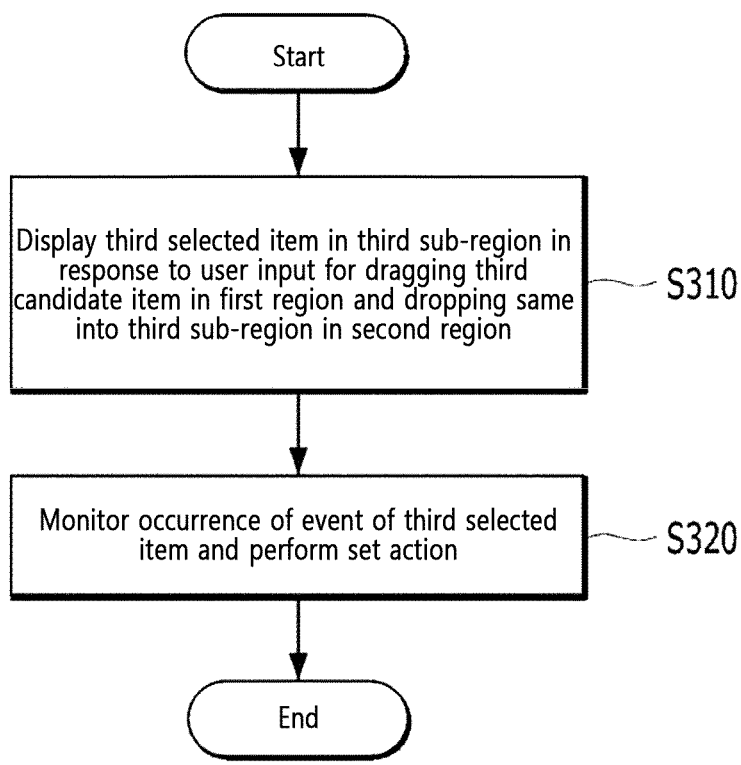
FIG. 15 is a view showing an embodiment of a method of generating another group of collected events, in the event detection device.
Figure 16:
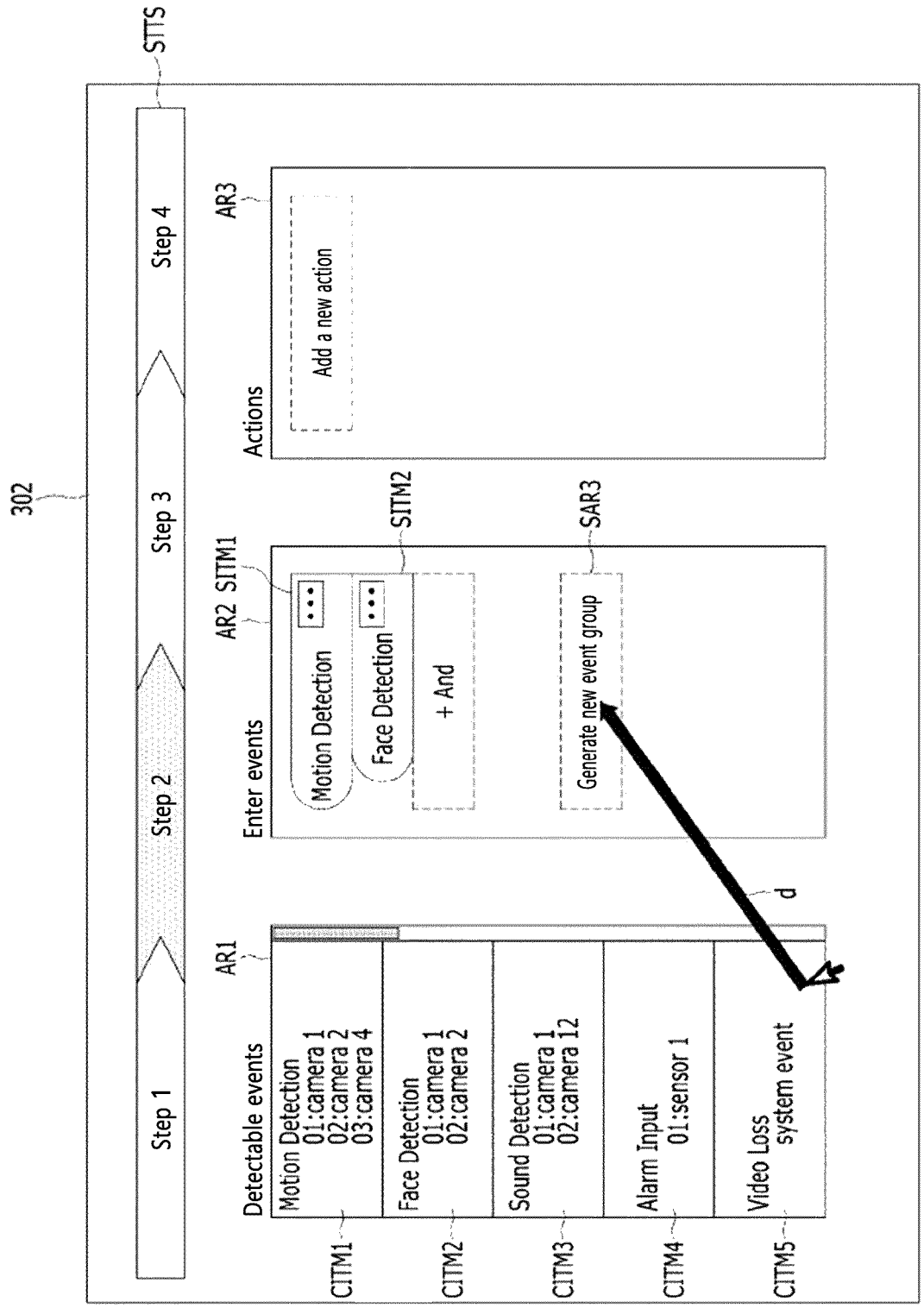
FIGS. 16 and 17 are views showing examples of screens displayed in step S310 of FIG. 15.
Figure 17:
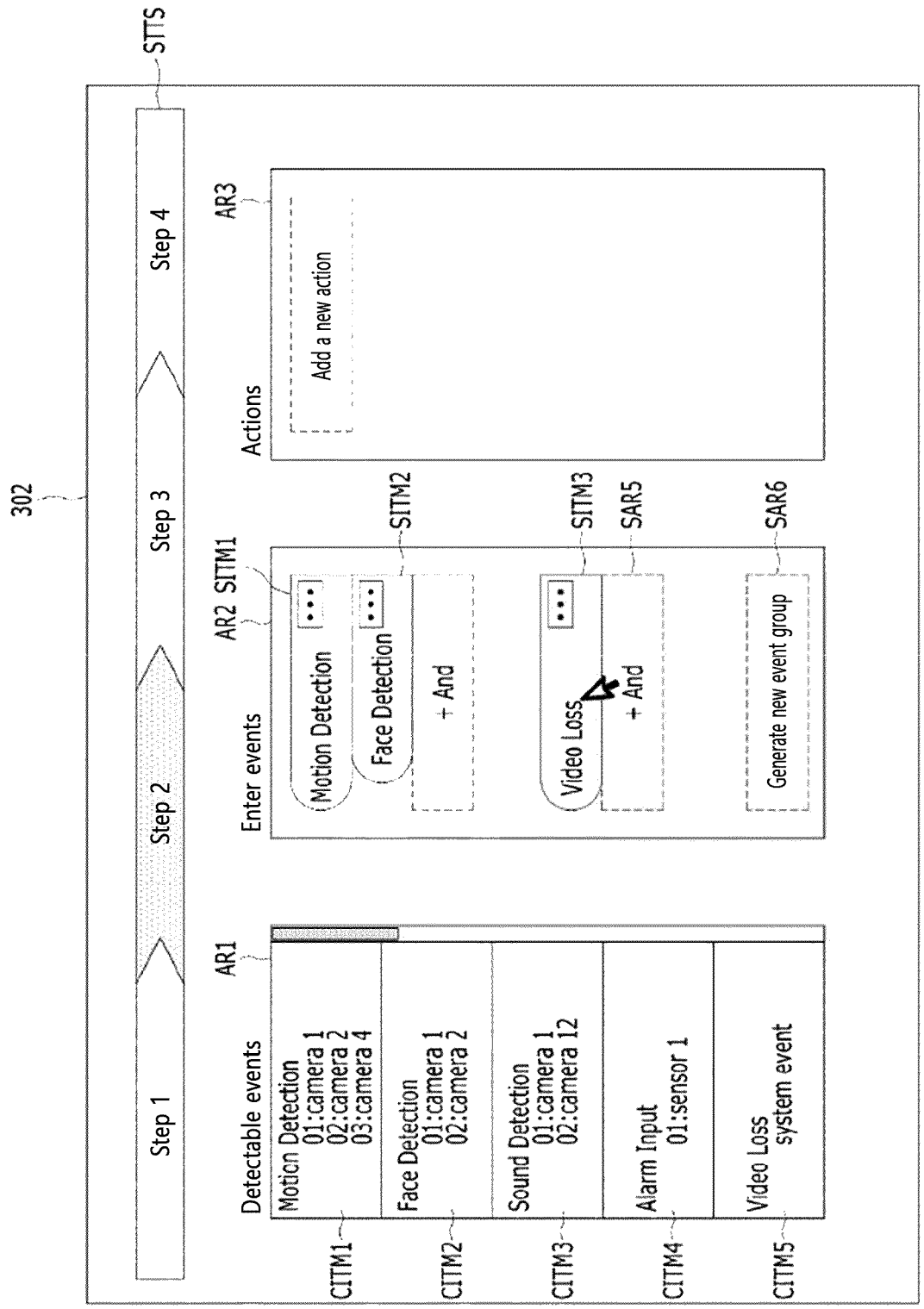

FIG. 15 is a view showing an embodiment of a method of generating another group of collected events, in the event detection device. FIGS. 16 and 17 are views showing examples of screens displayed in step S310 of FIG. 15.

Referring to FIGS. 1 and 15, the event detection device 150 displays, in the third sub-region, a third selected item indicating an event of the third candidate item from among the candidate items, in response to a user input for dragging the third candidate item and dropping the same into the third-sub region of the second region.

Referring to FIG. 16, a user input (d) for dragging any one of the candidate items CITM1 to CITM5 of the first region AR1, for example, the fifth candidate item CITM5, and dropping the same into the third sub-region SAR3 of the second region AR2 is received. In this instance, the third sub-region SAR3 is displayed when the first selected item SITM1 is generated in the first sub-region SAR1 as explained with reference to FIG. 8.

Subsequently, referring to FIG. 17 along with FIG. 16, a third selected item SITM3 indicating an event (e.g., image loss) of the fifth candidate item CITM5 is displayed in the third sub-region SAR3 in response to the user input (d).

The third selected item SITM3 belongs to a different group from the grouped first and second selected items SITM1 and SITM2. An event of the third selected item SITM3 may be the same as or different from events of the first and second selected items SITM1 and SITM2. When the third selected item SITM3 is displayed in the third sub-region SAR3, an additional sub-region SAR5 adjacent to the third selected item SITM3 may be further displayed. When the third selected item SITM3 is displayed in the third sub-region SAR3, a sixth sub-region SAR6 spaced apart therefrom may be further displayed.

As such, the third selected item SITM3 in a different group from the first and second selected items SITM1 and SITM2 may be further generated in the second region AR2. An additional selected item may be grouped along with the third selected item SITM3. Moreover, an action for the third selected item SITM3 may be set as explained with reference to FIGS. 11 to 13. Upon detecting the event of the third selected item SITM3, the event detection device 150 may perform a set action regardless of the events of the first and second selected items SITM1 and SITM2.

Figure 18:
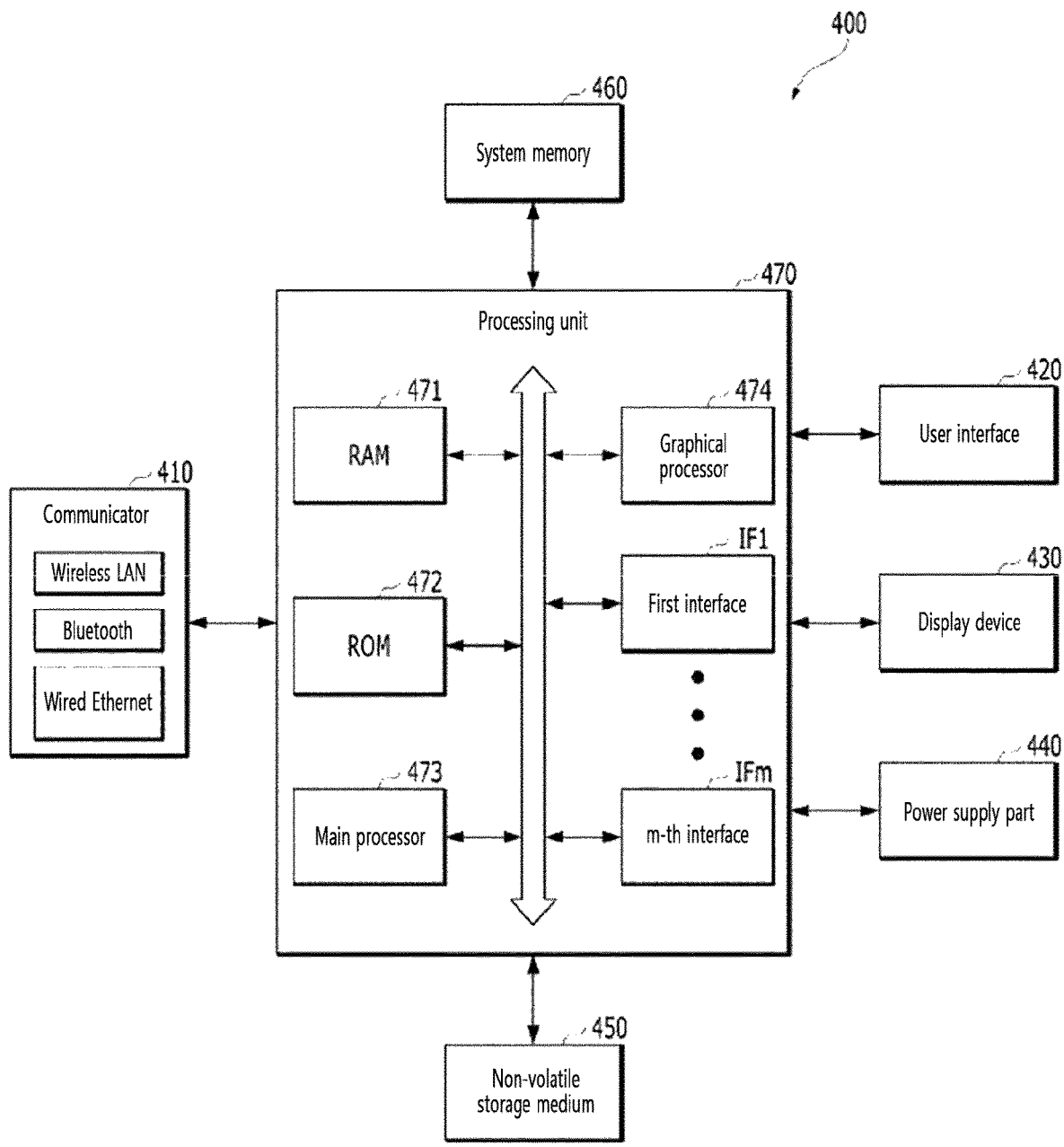
FIG. 18 is a block diagram showing an embodiment of a computing device capable of implementing the event detection device of FIG. 3.

FIG. 18 is a block diagram showing an embodiment of a computing device capable of implementing the event detection device of FIG. 3.

Referring to FIG. 18, the computing device may include communication equipment 410, a user interface 420, a display device 430, a power supply part 440, a non-volatile storage medium 450, a system memory 460, and a processing unit 470.

The communicator 410 may transmit and receive data or signals externally by at least one of various methods such as wireless LAN, Bluetooth, wired Ethernet, and so on, corresponding to configurations of the computing device 400.

The user interface 420 and the display device 430 may be configured like the user interface 220 and display device 220 explained with reference to FIG. 3, respectively. Hereinafter, redundant explanation will be omitted.

The power supply part 440 supplies electric power inputted from an external power source to the components of the computing device 400. The power supply part 440 may supply electric power outputted from a battery (not shown) of the computing device 400 to the components of the computing device 400.

The non-volatile storage medium 450 may store various program codes (or commands) and data for running and controlling the computing device 400 by the processing unit 470. The non-volatile storage medium 450 may be provided as the storage medium 240 of FIG. 3. In this case, the non-volatile storage medium 450 may store candidate event data CED, set event data SED, candidate action data CAD, set action data SAD, and a graphic interface source GUIS.

The system memory 460 may include at least one of computer-readable storage media such as RAM and ROM (Read Only Memory). The system memory 460 may function as a working memory of the processing unit 470, for example the main processor 473 and/or the graphical processor 474. The system memory 460 may function as a buffer memory of the computing device 400.

The processing unit 470 is configured to control overall operations of the computing device 400 and a flow of signals between the components of the computing device 400 and to process data. In response to a user input and/or if a preset condition is satisfied, the processing unit 470 may execute an operation system (OS) and various applications stored in the non-volatile storage medium 450.

The processing unit 470 may include RAM 471 functioning as working memory and/or buffer memory, ROM 472 storing control program codes for operation of the processing u nit 470, and a main processor 473.

The main processor 473 may load the program codes onto the RAM 471 and/or the system memory 460 from the ROM 472 and/or the non-volatile storage medium 450 and execute the loaded program codes.

The processing unit 470 may further include the graphical processor 474. The graphical processor 474 may generate graphic interfaces including various objects such as items, icons, images, text, and so on by using a computing unit and a rendering unit. The computing unit may compute property values such as coordinate, shape, size, and color of each object to be displayed according to the layout of the screen. The rendering unit may generate a screen with various layouts including objects based on the property values computed by the computing unit. The screens generated by the rendering unit may be displayed by the display device 430.

The first to n-th interfaces 1850-1 to 1850-$n$ may connect the components of the processing unit 470 to external components of the processing unit 470, such as the communicator 410, the user interface 420, the display device 430, the non-volatile storage medium 450, and the system memory 460.

The main processor 473 and/or the graphical processor 474 may load an application module, which perform operations of the controller 250 explained with reference to FIG. 3 when executed by them, onto the RAM 471 and/or the system memory 460 from the ROM 472 and/or the non-volatile storage medium 450, and execute the loaded application module. For example, the application module may include program codes performing functions of the event setter 251 and event detector 252 of FIG. 3, when executed by the main processor 473 and/or the graphical processor 474. The main processor 473 may load an operating system onto the RAM 471 and/or the system memory 460 from the ROM 472 and/or the non-volatile storage medium 450, and execute the loaded operating system. In this case, the operating system may provide an interface that allows the application module to use the components of the computing device 200.

Although specific embodiments and application examples have been described herein, they are merely to help comprehensive understanding of the present disclosure, but the present disclosure is not limited to the above-described embodiments. Various corrections and modifications are possible from the description by those of ordinary skill in the art to which the present disclosure pertains.

Accordingly, the subject matter of the present disclosure should not be limited based on the described embodiments, and it may be construed that not only claims to be described later but also all equal or equivalent modifications of the claims belong to the scope of the present disclosure.

What is claimed is:

1. An operating method for a computing device that communicates with a network system comprising a plurality of cameras, the operating method comprising the steps of:

receiving a first user input for selecting at least some of the plurality of cameras;

after the selection of the at least some of the plurality of cameras, displaying a first region and a second region separated from the first region, and listing, in the first region, candidate items indicating events that are detectable through the selected cameras;

displaying, in a first sub-region of the second region, a first selected item indicating an event of a first candidate item from among the candidate items in response to a second user input for dragging the first candidate item and dropping same into the second region;

displaying, in a second sub-region, a second selected item indicating an event of a second candidate item from among the candidate items in response to a third user input for dragging the second candidate item and dropping same into the second-sub region, which is adjacent to the first sub-region of the second region; an performing a set action according to all of the events of the first and second selected items, wherein the step of displaying the second selected item in the second sub-region comprises a step of providing a graphic interface for grouping the first and second selected items in the second region.

2. The operating method of claim 1, wherein the first region and the second region are arranged in a first direction, and the first and second selected items are arranged in a second direction intersecting the first direction.

3. The operating method of claim 2, wherein the providing of a graphic interface comprises displaying the second selected item in such a way as to have a narrower width in the first direction than the first selected item.

4. The operating method of claim 2, wherein the providing of a graphic interface comprises displaying the second selected item in such a way as to have a smaller area than the first selected item.

5. The operating method of claim 2, wherein the providing of a graphic interface comprises displaying the first and second selected items in such a way as to adjoint each other.

6. The operating method of claim 1, further comprising, when the first selected item is displayed in the first sub-region, displaying a third sub-region spaced further apart from the first selected item than the second sub-region.

7. The operating method of claim 6, further comprising:

displaying, in the third sub-region, a third selected item indicating an event of a third candidate item from among the candidate items, in response to a fourth user input for dragging the third candidate item and dropping the same into the third-sub region; and performing a second action set for the event of the third selected item, regardless of the events of the first and second selected items.

8. The operating method of claim 7, wherein the event of the second selected item is different from the event of the first selected item, and the event of the third selected item is the same as or different from the events of the first and second selected items.

9. The operating method of claim 1, further comprising:

displaying a third region separated from the first and second regions;

listing, in the first region, action items indicating a plurality of actions supported by the computing device in response to a fourth user input for selecting the first and second selected items of the graphic interface;

receiving a fifth user input for dragging at least one of the action items and dropping same into the third region; and determining that an action indicating the at least one of the action items is the set action.

10. The operating method of claim 1, wherein the candidate items further indicate detectable events through at least one device included in the network system along with the plurality of cameras.

11. A computing device for communicating with a network system comprising a plurality of cameras, the computing device comprising:

a communicator;

a display device;

a user interface; and at least one processor configured to communicate with the network system through the communicator and receive user inputs via the user interface, wherein the at least one processor:

displays a first region and a second region separated from the first region on the display device after receiving a first user input for selecting at least some of the plurality of cameras, and lists, in the first region, candidate items indicating events that are detectable through the selected cameras;

displays, in a first sub-region of the second region, a first selected item indicating an event of a first candidate item from among the candidate items in response to a second user input for dragging the first candidate item and dropping same into the second region displays, in a second sub-region, a second selected item indicating an event of a second candidate item from among the candidate items in response to a third user input for dragging the second candidate item and dropping same into the second-sub region, which is adjacent to the first sub-region of the second region; and performs a set action according to all of the events of the first and second selected items, wherein the at least one processor provides a graphic interface for grouping the first and second selected items in the second region when displaying the second selected item in the second sub-region.

12. An operating method for a computing device that communicates with a network system comprising a plurality of cameras, the operating method comprising:

displaying a setting screen including a first area for setting at least one event to be detected by the plurality of cameras and a second area for setting at least one action to be performed when an event set in the first area occurs, wherein the step of setting the at least one event in the first area comprises:

outputting an event list including one or more candidate events after a selection input for a first icon related to adding an event included in the first area is received;

outputting a first user interface including camera identification information corresponding to one or more cameras capable of detecting a specific event when the specific event is selected from the event list; and receiving a first selection input for selecting identification information corresponding to at least one camera for detecting the specific event in the first user interface.

13. The operating method of claim 12, wherein the step of setting the at least one action in the second area comprises:

outputting an action list including one or more candidate actions when a selection input for a second icon related to adding an action included in the second area is received; and outputting a second user interface for setting detailed information on a specific action when the specific action is selected from the action list.

14. The operating method of claim 13, wherein the at least one action set in the second area is performed when the at least one event set in the first area is detected by the at least one camera.

15. The operating method of claim 14, wherein when a plurality of events are set in the first area, the plurality of events are arranged differently from an arrangement direction of the first area and the second area.

16. The operating method of claim 15, wherein when a plurality of actions are set in the second area, the plurality of actions are arranged differently from an arrangement direction of the first area and the second area.

17. The operating method of claim 16, wherein an arrangement direction of the plurality of events and an arrangement direction of the plurality of actions are the same.

* * * * *